United States Patent [19]

Yee

[11] Patent Number: 5,042,550
[45] Date of Patent: Aug. 27, 1991

[54] VEHICLE SUN BLIND

[76] Inventor: Seng L. Yee, 111 Jalan Kuras, Singapore 2057, Singapore

[21] Appl. No.: 340,202

[22] Filed: Apr. 19, 1989

[30] Foreign Application Priority Data

Apr. 21, 1988 [GB] United Kingdom ............... 88100755

[51] Int. Cl.$^5$ ............................................... E06B 3/94
[52] U.S. Cl. ................................ 160/84.1; 160/370.2; 296/97.1
[58] Field of Search ............. 160/84.1, 90, 101, 168.1, 160/166.1, 370.2; 296/97.1, 97.4, 97.8

[56] References Cited

U.S. PATENT DOCUMENTS

| 4,518,025 | 5/1985 | Judkins ......................... 160/168.1 X |
| 4,635,993 | 1/1987 | Hooper et al. |
| 4,647,102 | 3/1987 | Ebrahimzadeh . |
| 4,652,039 | 3/1987 | Richards . |
| 4,932,710 | 6/1990 | Chen ............................ 160/370.2 X |
| 4,934,436 | 6/1990 | Schnebly ............................ 160/84.1 |

Primary Examiner—Blair M. Johnson
Attorney, Agent, or Firm—Fleit, Jacobson, Cohn, Price, Holman & Stern

[57] ABSTRACT

This invention relates to a windshield sun blind and side window sun blind for vehicle windows to be mounted on vehicle dashboards and from vehicle side window frames. The windshield blind is in the form of a collapsible pleated blind and may be vertically drawn upward and releasably hook engaged with a suitable latching device provided therefor. The window blind is similarly operable. An warm air trapped between the windshield and its blind, can be extracted out of the vehicle by the use of an extractor fan through the ventilation systems that is already existing in the vehicle.

6 Claims, 10 Drawing Sheets

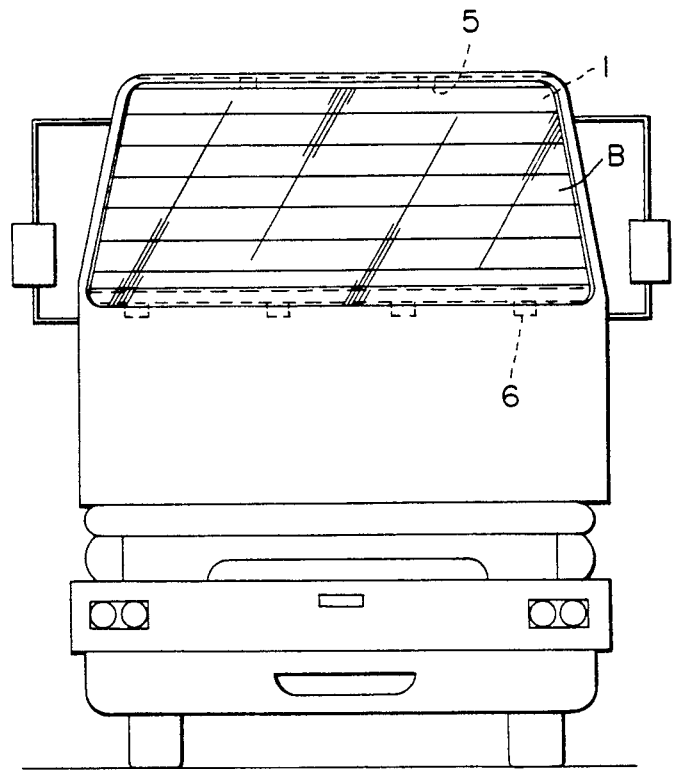
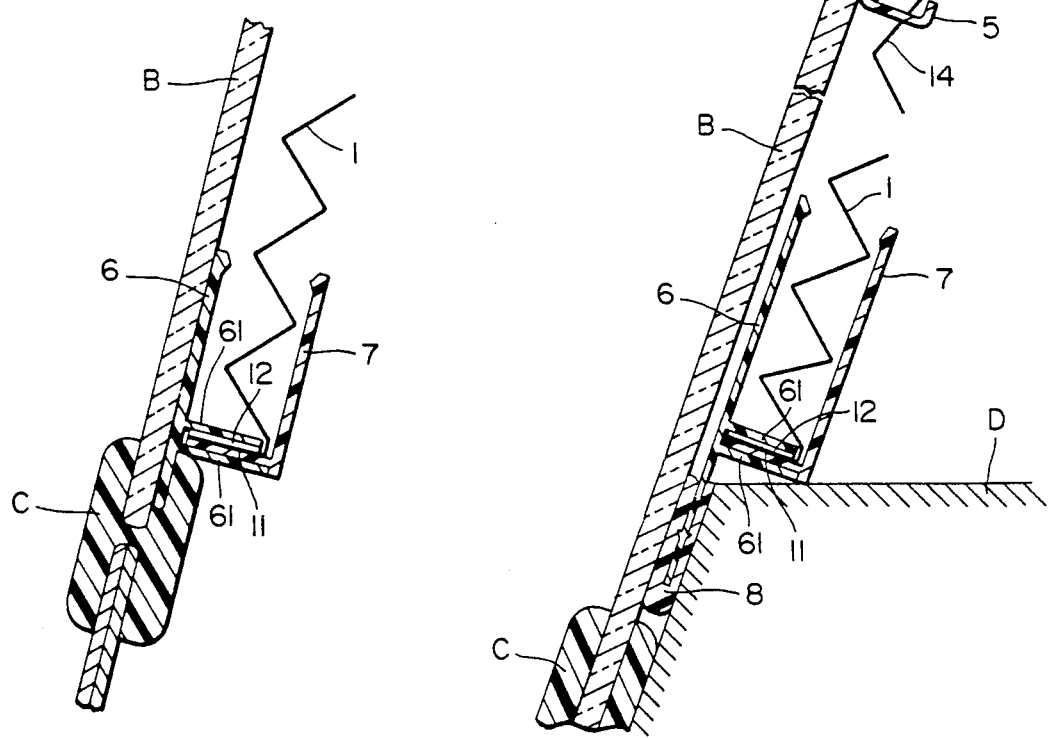

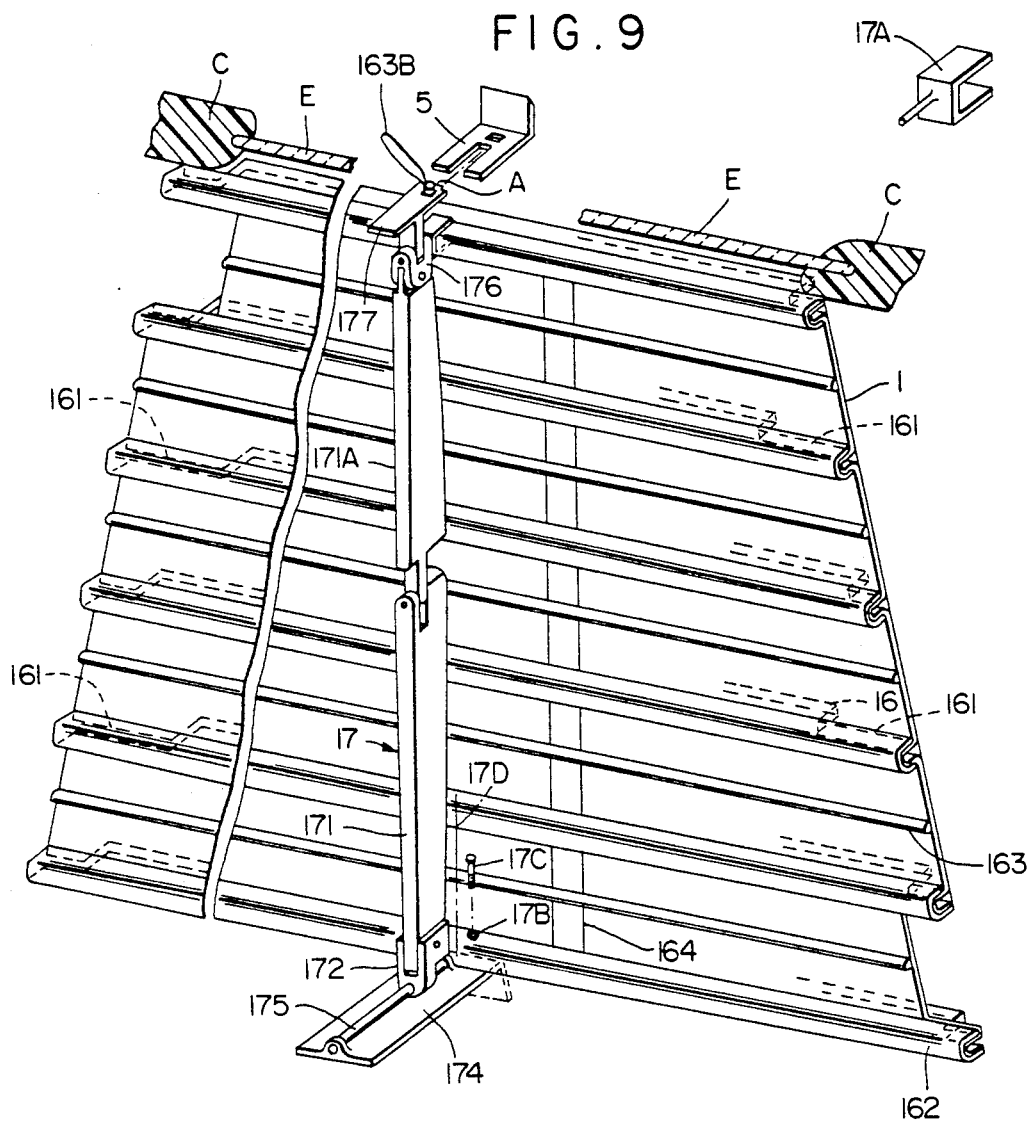
FIG. 9
FIG. 9A
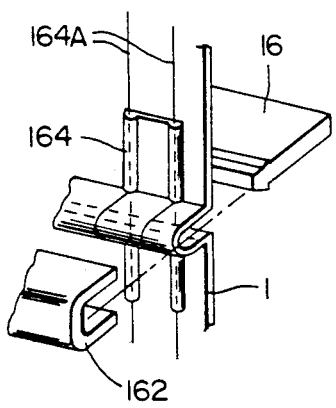
FIG. 10
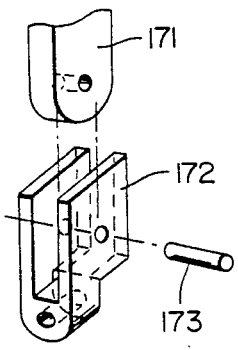
FIG. 11
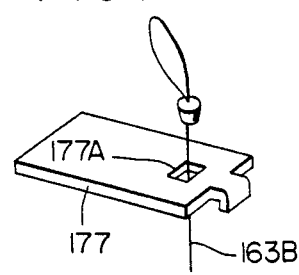
FIG. 12

VEHICLE SUN BLIND

BACKGROUND OF THE INVENTION

1. Field of the Invention

This invention relates to retractable sun blinds used commonly on the inside, or outside, of a vehicle window, and in particular the windshield or rear window glass of a vehicle to prevent solar heat from penetrating and damaging the dashboard or other components found within a vehicle.

2. Description of the Prior Art

When vehicles are parked in open or uncovered areas they are subjected to the direct heat of the sun resulting in excessive build up within the vehicles which cannot be discharged by natural means when the window of the vehicles are closed. As a result of this build up of heat there can be permanent damage caused to the dashboards and to other sensitive devices within the vehicle. In a prior method, a heat reflective device consisting of light but rigid composition boards, faced on one side with a non glare reflective material is used. This device placed inside and against the windshield of the vehicle to reflect the sun rays. The disadvantage of this device is that it is bulky and cumbersome to store in the vehicle after its use.

Another type of prior shade is a pleated, removable curtain assembly attached to the windshield with suction cups and including tension rods to hold the pleated assembly in place. Again the inherent disadvantages of this prior shade is that the device must be removed and is cumbersome to store after its use.

In yet another form of prior art is a shade in the form of a retractable scroll attached to the windshield by suction cups and including tension springs to draw and retract the shade back when the shade is not in use. In the retracted unused state, this form of prior art hampers the full view of the driver. Further the tension springs can be easily weakened by repeated use.

SUMMARY OF THE INVENTION

According to the present invention a vehicle windshield or window blind is provided comprising a pleated opaque paper board, synthetic fabric or injection moulded plastic blades. The blind is collapsible and constructed essentially from waterresistant material as well as coated on the outside with non-glare heat reflective medium. The blind may be left permanently on the dash-board or window while the vehicle is being driven as includes a housing for holding the retracted blades which are only a few millimeters high when folded or retracted and which therefore do not obstruct the view of the driver of the vehicle. The housing is either fastened to the dashboard by suitable clips or other forms of fastening devices. The pleated blinds may be vertically drawn upward toward and slightly beyond the rearview mirror and then hooked on to a latching device located at the roof of the vehicle. Similarly, the windows of the vehicle can be protected. Alternatively, the pleated blind assembly can be installed on the outside of the side glass windows.

A wind visor can be incorporated into the aforesaid assembly as a further preferred enhancement to prevent dust and excessive wind migration into the interior of the vehicle. The pleated blind can be drawn up and lowered down by a flexible chord attached to a operation handle or electric motor. The whole assembly is fastened by suitable clips, and other forms of attachment devices.

Similarly, the blind device can be installed to the inside of the rear windscreen in the aforesaid method with suitable fastening, clipping and drawing devices. The advantages of such a device is obvious in that it can be systematically folded or unfolded for convenient usage; the compactness of such an device; simplicity in installation without the need for use of drilling tools; and the general aesthetics of the assembly within the vehicle.

BRIEF DESCRIPTION OF THE DRAWINGS

FIG. 6 is a front elevational view of the blind construction when installed on the front windshield.

FIG. 7 shows a sectional view of the blind in FIG. 6 showing mounting details.

FIG. 8 shows an alternative construction of FIG. 7.

FIG. 9 is a perspective view of a front blind with its exhaust mechanism incorporated.

FIG. 9a is an enlarged perspective view of the U-shaped support portion of the upper support shown in FIG. 9.

FIG. 10 is a perspective view detailing the insertions and fastening functions for the blind of FIG. 9.

FIG. 11 is the perspective view of the U-shaped sliding component and the lower portion of the support construction as shown in FIG. 9.

FIG. 12 is the perspective view of mechanism details used to guide the blind together with the fastening system.

DESCRIPTION OF THE PREFERRED EMBODIMENT

Figure 1:
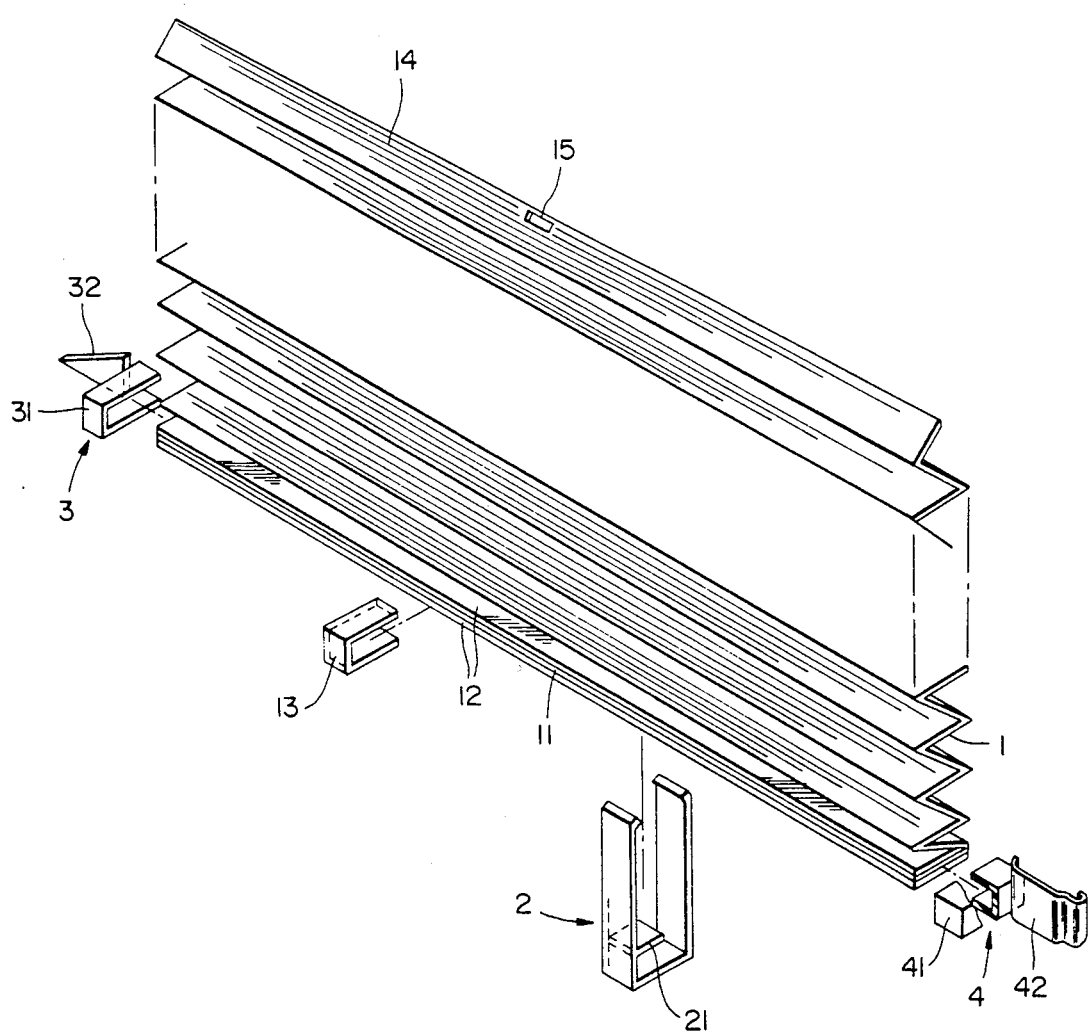
FIG. 1 is an exploded view showing the construction and mounting parts of the pleated blind in its unfolded position.

FIG. 1 shows the pleated blind 1 made of either opaque paper board, synthetic fabric or injection formed plastic blades linked to give a face in continuous pleated form which is capable of unfolding. The bottom 11 of its lowest end is held in place by holding clip 13. The blind 1 can be contoured according to the shape and inclined edges of the windscreen and windows. The uppermost blade or the leading blade 14 of the blind 1 is attached with one or more hooks or hooked receptacles 15 to enable the pleated blind to be hung and secured during usage. The housing 2 is U-shaped and from the internal portion, at the lowest possible level, a separating and retaining plate 21 is located to allow sandwiched plates 12 containing slot 11 to be fitted into plate 21. Element 3 has holding clip 13 and a triangular plate 32. Holding clip 41 has similar function to clip 13. Triangular plate 32 is used to attach the assembly to the existing frame work in the vehicle.

Member 4 consist of holding clip 41 and securing plate 42. The holding clip 41 is the same as the aforesaid insertion element 3. In addition, the securing plate 42 is fastened to suitable locations of the vehicle. Hook 5 is inserted and secured to the roof of the vehicle so that when the pleated blind 1 has been unfolded, the hook slot 15 can be engaged securely. In a typically unfolded position, total shading canna be achieved. The housing element 2 gathers and locates the folded pleats. The total height is typically between 8 mm and 20 mm and therefore offers little obstruction to the view of the screen.

Figure 2:
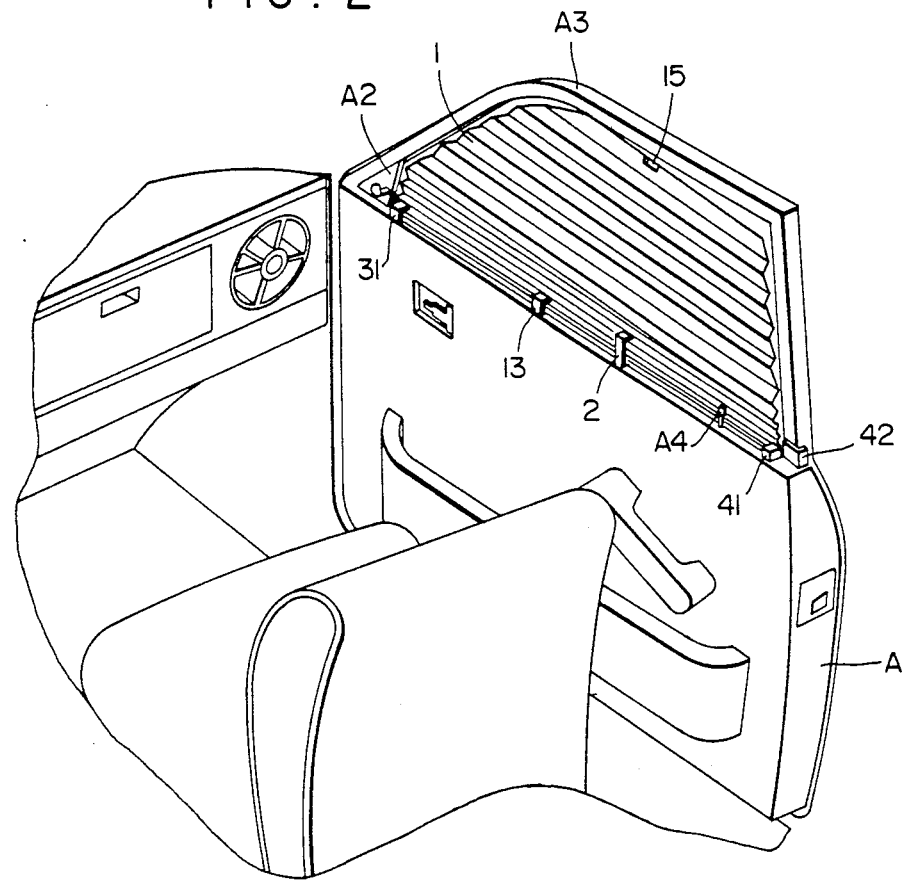
FIG. 2 is an perspective view of an alternative form of blind unfolded and mounted to the side window section of the vehicle.
Figure 2A:
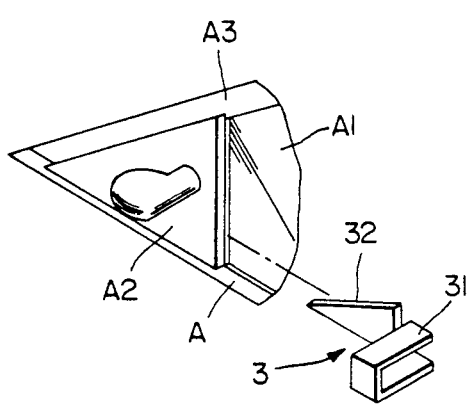
FIG. 2a is an fragmentary, enlarged perspective view of the forward portion of the vehicle side door illustrated in FIG. 2.
Figure 2B:
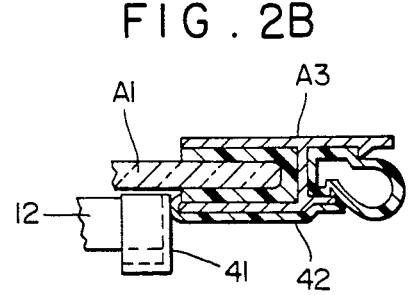
FIG. 2b is an enlarged fragmentary horizontal sectional view of the rear edge of the door illustrated in FIG. 2.

Alternatively, the window blinds in FIG. 2 shows the above-mentioned pleated blind 1, the insertion and securing member 3 and clipping and securing member 4 inserted and located at the two ends of sandwiched material 12 which is inserted in the space between the car side front door. A front door A includes glass A1 and installation plate material A2 of a rear vision mirror. The plate material 2A is bent and clipped at the side location of door frame A3 in a secure condition. In addition, a holding clip 13 and a housing part 2 are inserted in advance to hold the member 12. The pleated blind 1 is tailored in shape to match the inclined edge of the car window. Its features are that the pleated blind 1 unfolds itself in fan shape from its bottom 11 until it forms a perpendicular angle or smaller than perpendicular angle with the door frame and then unfolds in parallel.

Upon unfolding, the blind 1 will have almost total coverage. Also in it is folded position, it is superimposed in sequence to be housed in the bottom edge of the car window by the housing element 2. Moreover, its folded thickness is only between 8 mm to 20 mm so as not to affect the driver's vision nor block the rear mirror vision of the driver. For installation to the side rear door, only two holding and securing members 4 are used for separate insertion into the two ends of ember 12. All other parts and installation methods are the same.

Figure 3:
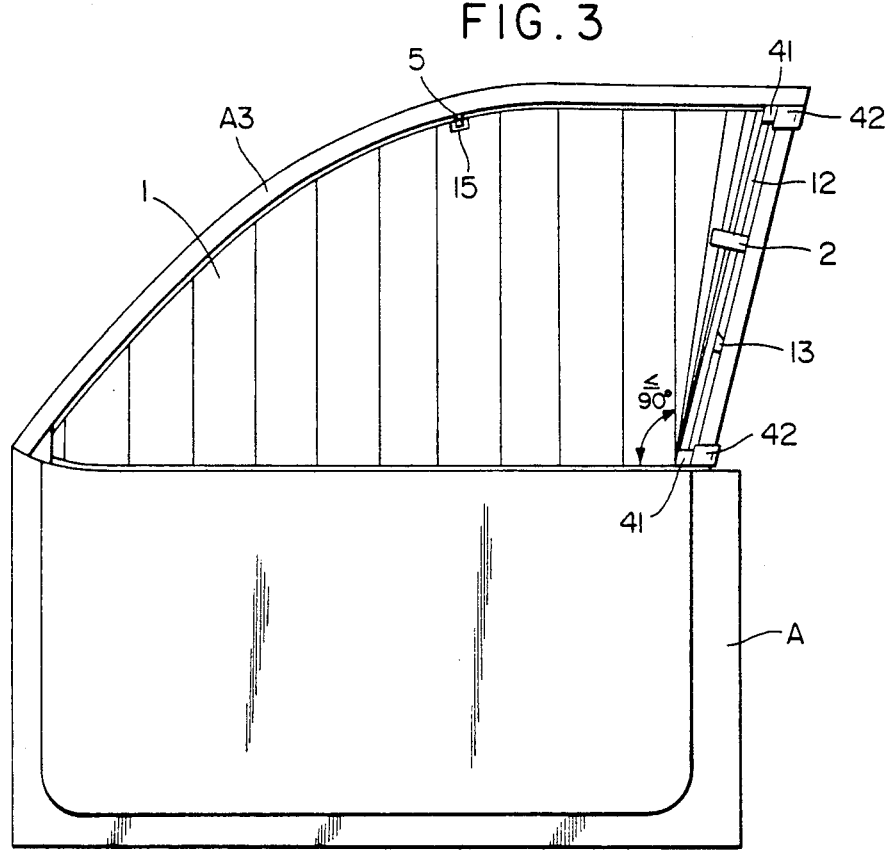
FIG. 3 is an elevation another form of blind unfolded and mounted on the side window horizontal.
Figure 4:
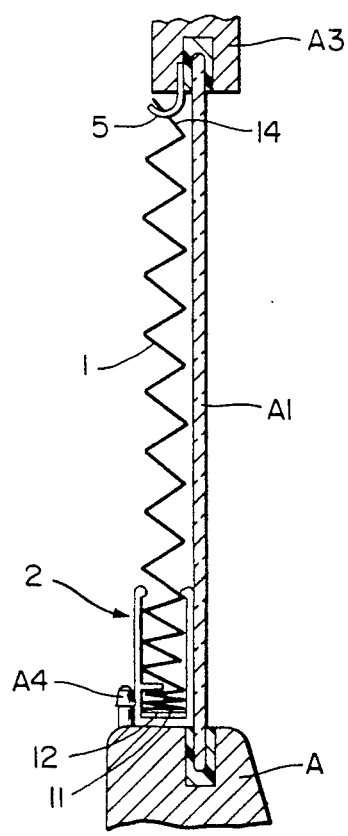
FIG. 4 is a sectional view of the blind illustrated in FIG. 2 and its housing fastening and mounting details.

As the bottom edge of doors frame of some cars not streamlined, installation of the pleated blind 1 can be adapted to the vertical mode as shown in FIG. 3. The two ends of the two plate 12 of the pleated blind 1 is similarly and separately inserted with holding and securing element 4 and element 42 at the side of door frame A3. However, in this actual application, the holding clip 41 of the clipping and securing member 4 needs to be turned to one angle to enable its opening to face directly with element 12 in a vertical state to enable 12 to be secured. FIG. 4 shows the end elevation of the said blind in its unfolded position.

Figure 5:
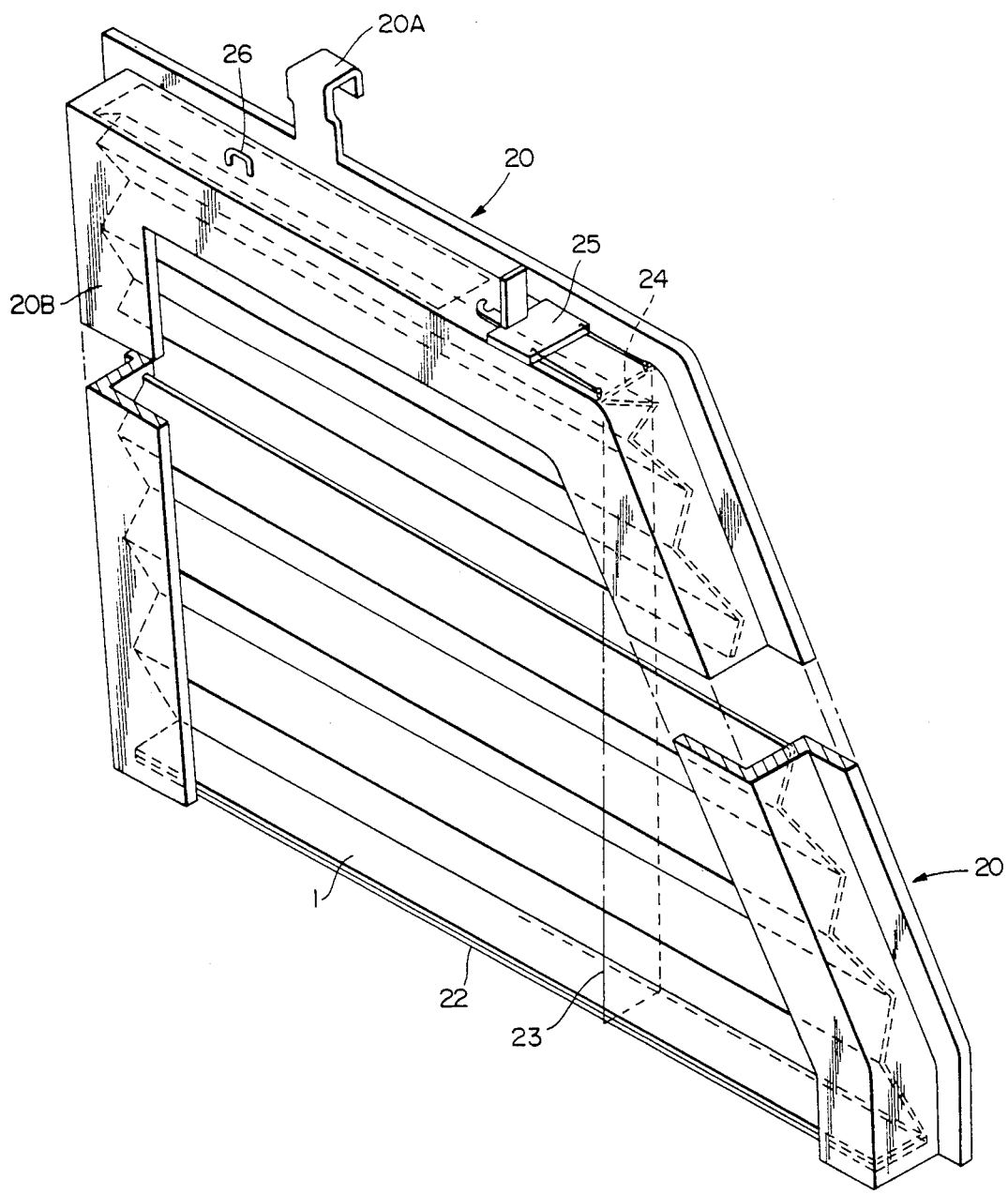
FIG. 5 is a perspective drawing showing still another installation of the blind to a vehicle side window glass and incorporating the wind visor.

FIG. 5 shows the pleated blind 1 is of similar construction to FIG. 1 and shows its use in an external application. Bottom 22 of its lowest end is a spring plate construction. The internal and external surfaces of blind 1 are given waterproofing treatment and the side facing the sun is treated to reflect light. Further, the upper margin of the wind visor portion thereof includes an integral hook 20A for support from the upper edge of the associated window glass.

At the bend of the wind visor 20 are two small holes. Below them small rods 24 of equal distance and above them is operating handle 25. In front of the operating handle are two small holes to allow either end of cord 23 to be tied onto it, while passing through the small holes of the wind visor 20 at upper level of same side and to the small hole of the operating handle 25. This end of the cord will again pass through the small holes of wind visor of same side. The cord continues to go to the base of pleated blind 1 and crosses the spring steel element 22, and again goes through small holes of wind visor 20 at the end near the car door glass.

When the operating handle is pushed backwards and hooked on to the locking element 26 behind the wind visor, the pleated blind 1 will be folded, stacked and withdrawn upwards into the space between car door glass and the wind visor 20. At the same time, subjecting a pull of cord or string 23 to fold the pleated blind on the spring steel plate 22, the spring steel plate 22 will bend to form a arch shape at the top of the wind visor.

As a further enhancement to the visor 20, is the continuation 20B of the visor 20B towards its rear. With suitable air escape vents located there whilst the vehicle is in motion or in windy conditions, the addition member 20B will act as a restraint to the pleated blind 1 in its invented pleated blind 1 to the internal side the front windscreen glass of a car. The pleated blind 1 is as same as that of the aforementioned actual application. The insertion and securing member 6 has at the inner side at a lower position and element 61 with one protruding edge to form a joint groove. The "L" shape element 7 together with the lower end bottom 11 of pleated blind 1 and element 12 are inserted into a groove to secure the pleated blind 1. This procedure can make the pleated blind 1, when unfolded, to be guarded and restrained to the housing when drawn towards hook 5.

The pleated blind 1 is made according to the contour of the front windscreen glass B to enable it to attain total coverage. If the contact face of front windscreen glass B and the neutral rubber C, as shown in FIG. 7, has a space from instrument console D as shown in FIG. 8, several tension rubber parts 8 with sliced opening can be inserted into that space at intervals.

FIG. 9 to FIG. 15, shows the pleated blind construction with exhaust functions. At the rear side of pleated blind 1, there is a C-shaped metal insertion clip 162 which is pre-fabricated according to the contour of the front windscreen. Its connection edge has a protruding flexible rubber strip 16 on the side of the pleated blind facing the outside. It also securely clips pleated blind 1 in between as shown in FIG. 10, so that when the pleated blind unfolds horizontally, the C-shaped insertion clip will provide appropriate horizontal support for the protruding flexible rubber to all parts and will match with the front windscreen glass E. There are also 3 sets of rectangular shaped inserts 164 at the rear side pleated blind. On its left and right sides, there are narrow passages to allow cord 164A to pass through. At the end of inserts 164 are pre-determined length of cords which are held in between the member 162. This enables the cord to pass round the inserts 164 Support element 17 is pivoted to its bottom end by pin 173 on to a sliding bracket 174 which is turn pivoted on pin 175. The support element 17 consist of 2 foldable members 171 and 171A.

To its top end, support 17 is pivoted on element 176 including a U-shaped support portion 17A and 177 which is essentially a handle. There is a small hole for cord 163B to be connected at member 172. Base member 174 is positioned and retained in position between windscreen glass and the dash-board. When the pleated blind 1 is unfolded, by pulling cord 17D, the base support is drawn closer to windscreen, which enable the pleated blind to be drawn closer to the windscreen. Cord 163B is fed through a series of parallel holes located on the blind and one end of the cord is tied on to the base of the blind while the other and is fed through the pleats to hold 177A on FIG. 12.

Figure 13:
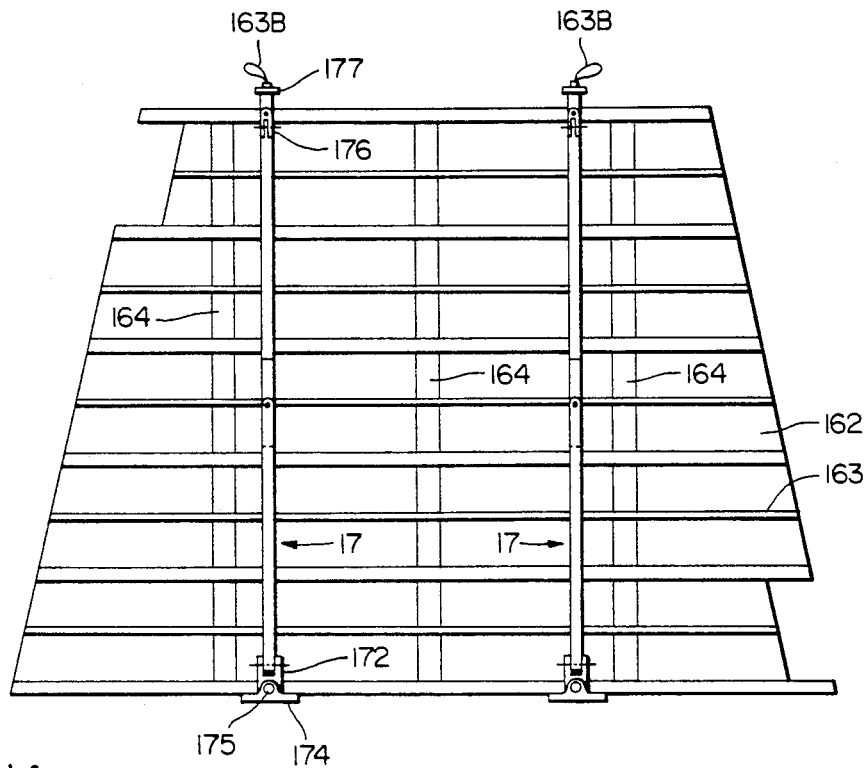
FIG. 13 is a rear elevation of the front windshield blind viewed from inside the vehicle.
Figure 14:
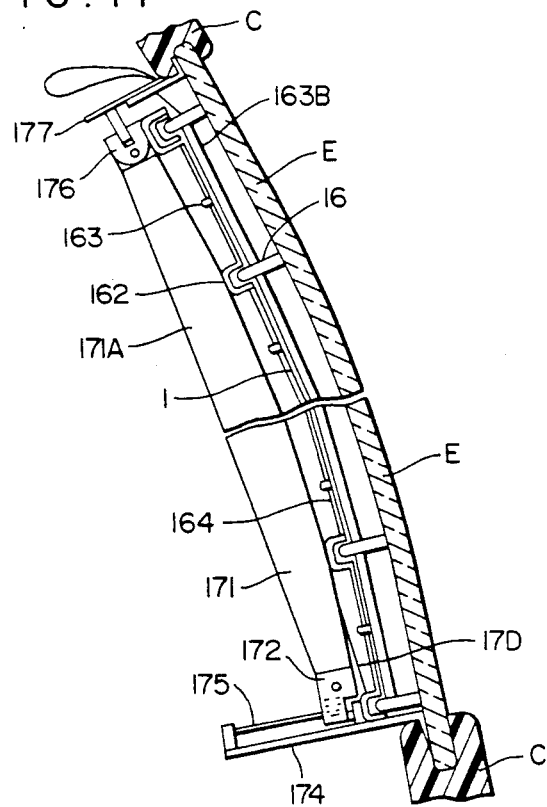
FIG. 14 is a vertical sectional view of the blind installed at the front windscreen.
Figure 15:
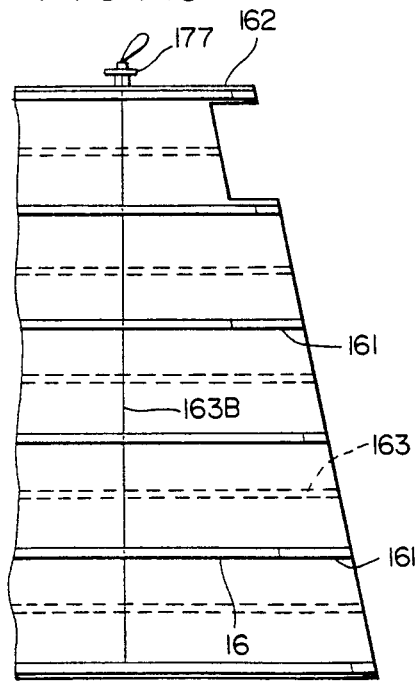
FIG. 15 is a fragmentary front elevational view of FIG. 13 facing the front windscreen.

The cord is terminated with a loop and held together with a stopper. Essentially cords 163B are guide cords to allow ease of collection of the pleated folds in its folding position. Alternative arrangements are shown in FIG. 13, 14 and 15. The longer opening 161 forms an opposite running pattern and constitutes a circulating route for hot air trapped between the pleated blind 1 and the windscreen E. An extractor duct can be connected to draw out the warm air or warm air can be circulated to melt any snow or ice that covers the windscreen.

An alternative usage is the incorporation of pleated blind 1 together with a wind visor extraction of the air is well-known to persons skilled in the art. A schematic arrangement is further shown in FIG. 16 to 18 respectively.

Figure 16:
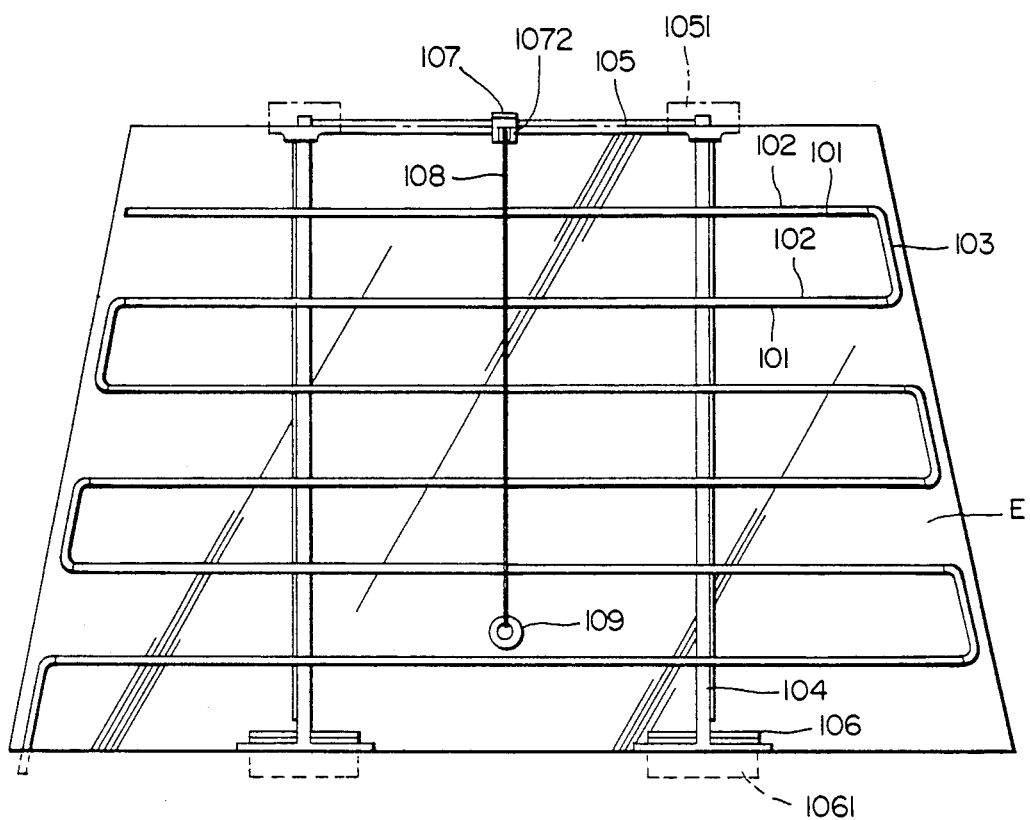
FIG. 16 is an elevation of the blind installed at the rear windscreen with an exhaust ducting incorporated.
Figure 17:
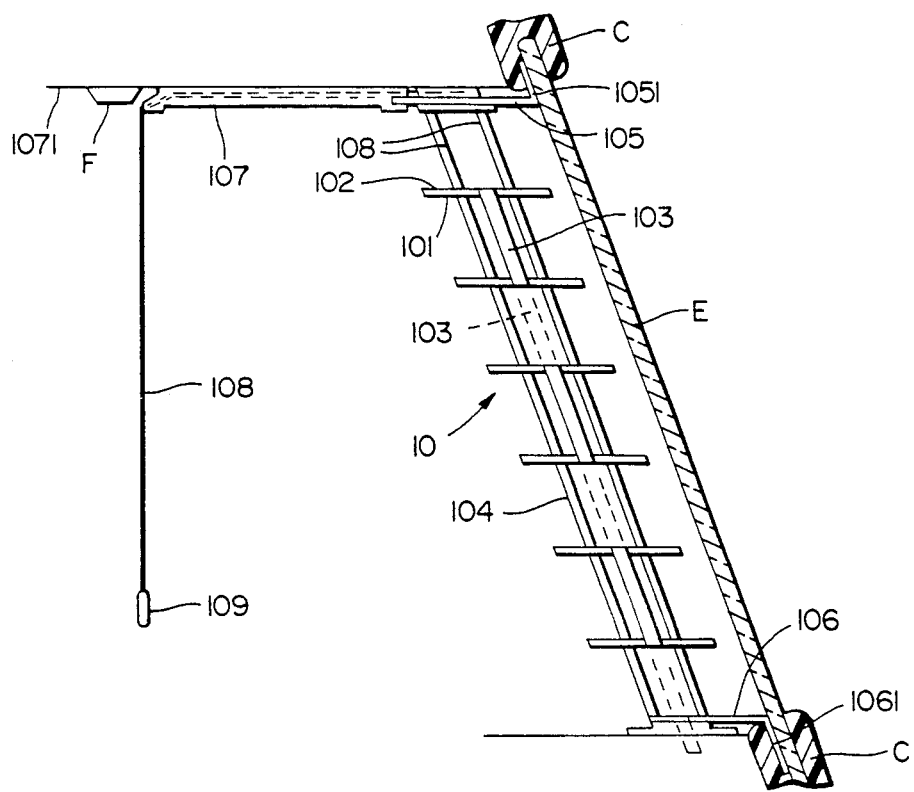
FIG. 17 is a vertical sectional view of the blind of FIG. 16.
Figure 18:
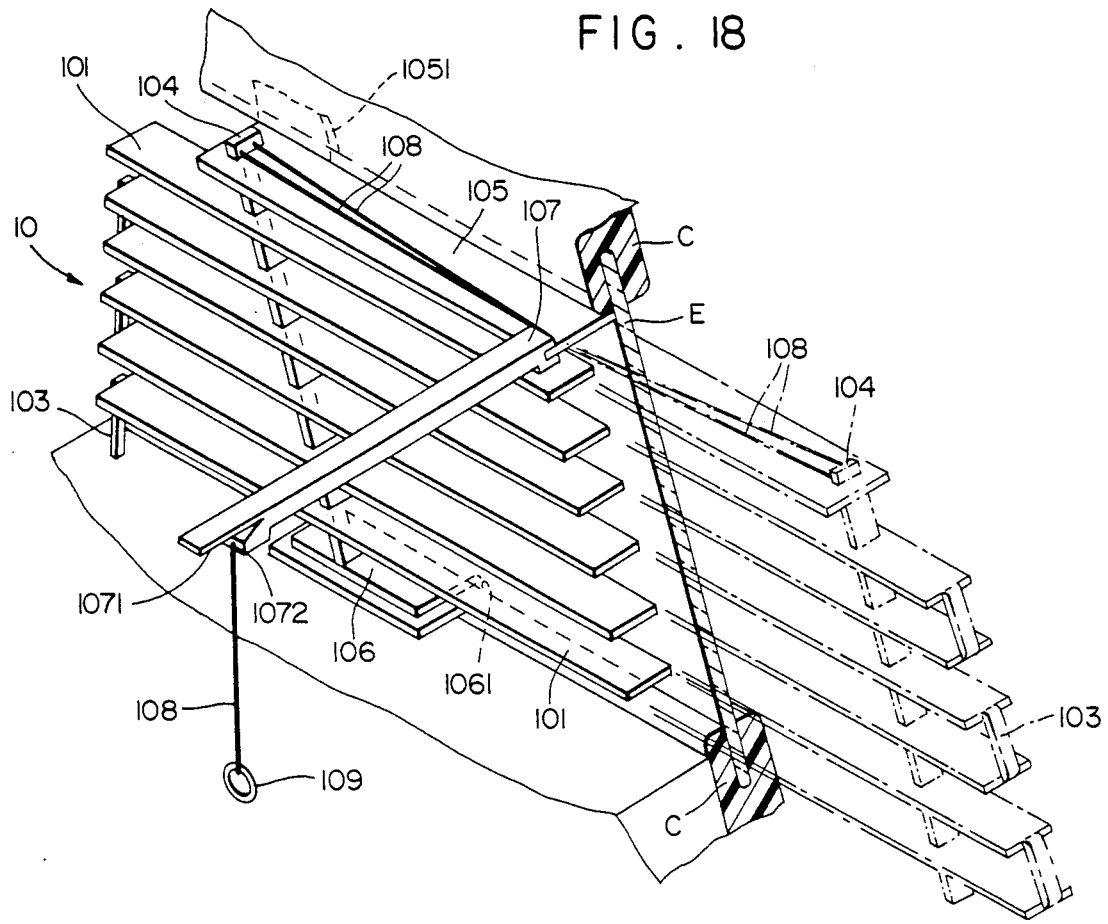
FIG. 18 is a perspective view of the blind of FIG. 16.
Figure 18A:
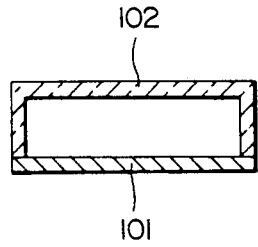
FIG. 18a is an enlarged fragmentary sectional view of the one of the blind blades and its thin transparent layer sheet.
Figure 18B:
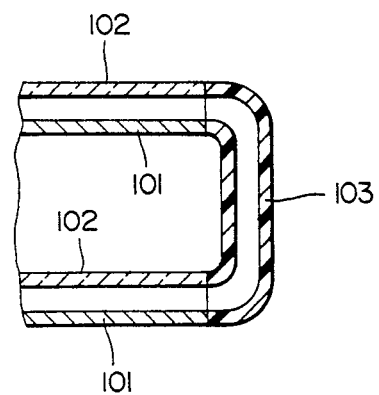
FIG. 18b is a fragmentary enlarged vertical sectional view illustrating a pair of vertically adjacent blade ends and the connecting tube extending therebetween.

A louver window or blind 10 and its blades 101 are stringed and placed on two support 104. A thin layer of transparent sheet 102 (or flexible transparent coating) can be attached onto the same side of each blade 101 to create a small gap between transparent sheet 102 and blade 101. Also all adjoining blades are joined together at their ends by a flexible tube 103 to form a passable circulating path, as shown in FIG. 16, 17 and 18. Furthermore, it enables the end of the flow path to be connected with the piping of air extractor, blower or solar powered air extract or (not shown in drawing), in order to carry out the discharge of warm air out of the car.

The two supports 104 are installed in parallel with their upper ends passing through a securing plate 105. The lower ends of supports pass through another securing plate 106 to fix its position. The supports 104 allow light penetration and two holes are made in their upper ends for two separate cords 108 to pass through. From top to bottom, the cords 108 through each blade 101 to form equal distances between all blades 101. The free ends of the above-mentioned 4 cords 108 extend toward the center of the lower window 10 and pass through the guiding hole 1072 of one piping 107. Then, the cord ends are terminated at ring 109 to enable driver to pull and release the cords 108 any time in the vehicle to raise or lower the height of lower window 10.

Securing plates 105 and 106 Two vertical plates 1051 are installed at the upper securing plate 105 for inserting them in the gap between the glass E and the neutral rubber ring C to fix the position. Go through holes are made at their both ends for passing through by support 104. The above-mentioned piping 107 is separately inserted and fixed at the its central portion. The lower securing plate 106 also have two vertical plates 1061 for inserting into the gap between the glass E and the neutral rubber ring C to fix the position and two go through holes are made at their both ends for the lower ends of above-mentioned support 104 to pass through them to fix the position.

A groove hole is made at the front end of piping 107 to be used inserting and holding at the central portion of the above-mentioned securing plate 105 and its rear end is installed with one extending plate 1071 which can be inserted at the portion of a car's interior light F to enable the piping 107 to have its both ends in a secured state. The body of piping 107 has one go through hole 1072 for the above-mentioned 4 ropes 108 to pass through them and its ends again tied to a pull ring 109.

As per the above-mentioned, the driver in the vehicle can at any time, simply and easily adjust the ascending descending height of louver window 10 and equipped with air extractor, blower or solar powered air extractor to discharge the warm air contained between louver 10 and glass E, out of the vehicle to achieve the desired objective.

Figure 19:
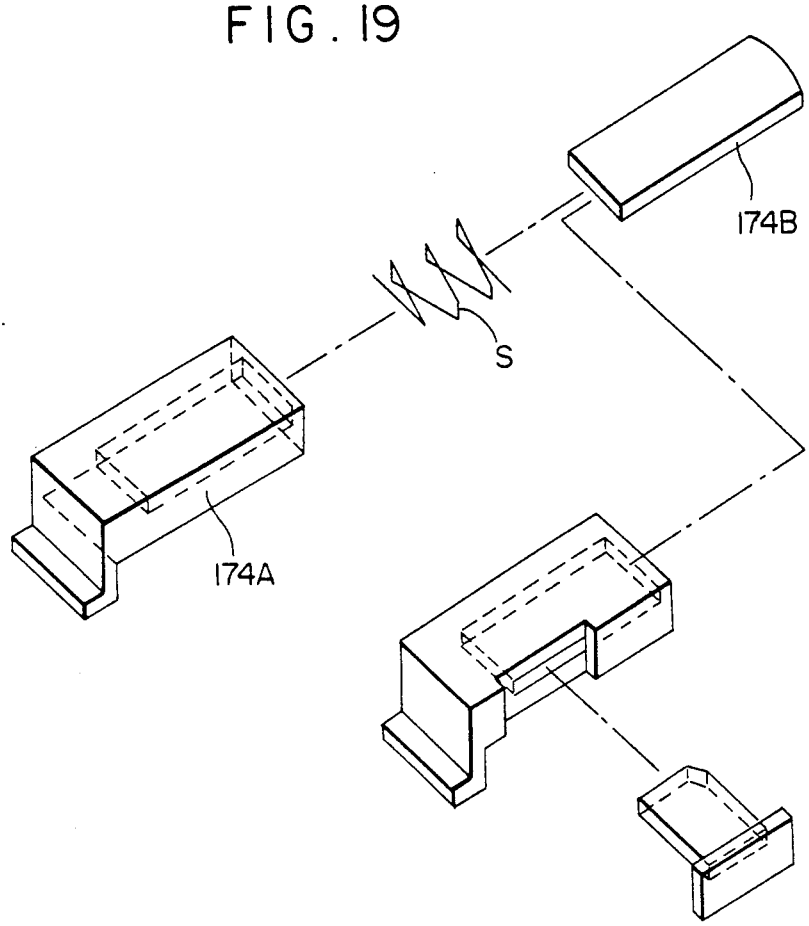
FIG. 19 is the perspective view of the fastening mechanism of the blind.
Figure 20:
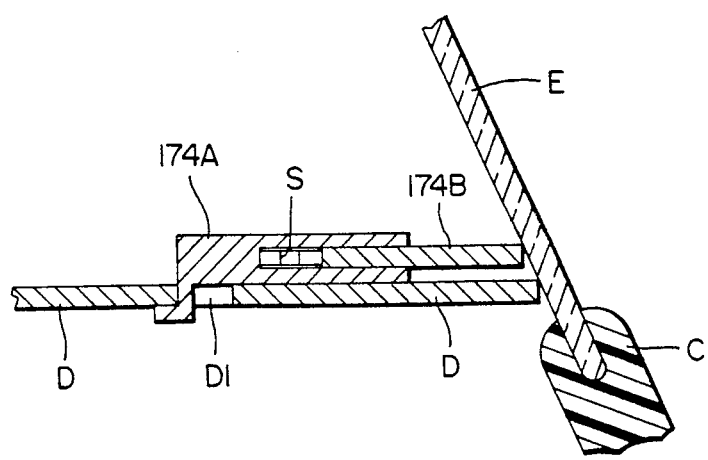
FIG. 20 is the sectional view of the fastening mechanism in position.

The fastening devices preferred is designed to provide means to achieve this end without the need for drilling and with ease of use. The device comprised of a securing part 174A in which is a telescopic tongue 174B held in tension outwards by spring S as shown in FIG. 19. The rear end of the securing part 174A is provided with a stepped projection. This is in turn located into slot D1 provided for in the dashboard D as shown in sectional view of FIG. 20. Alternatively 174A can be replaced with member 174C together with pin 174D to replace the springs.

I claim:

1. A vehicle window blind comprising a set of flexible, extendable and retractable pleated blades, said blind having a first and a second housing means for mounting adjacent at least one portion of a vehicle and from which housing means said blind is guidingly supported for movement between retracted and extended positions, said housing means including an elongated first portion along and from which said first end of said blind and is supported, said housing means including two opposing guide portions diverging away from said first portion in the direction in which said pleated blades are extendable, said second end of said blind extending between said diverging guide portions and including a spring plate extending therealong, said spring plate being anchored to said second end and being arched between said two opposing guide portions upon said second end of said blind being retracted toward said first end of said blind and said first portion of said housing means.

2. The vehicle window blind of claim 1 wherein said housing means includes a support hook for engagement over and support from the upper edge of a downwardly retractable vehicle window.

3. The vehicle window blind of claim 1 wherein said first and two opposing guide portions include in-turn flanges for confining said blade against lateral movement when in both the extended and retracted positions thereof.

4. The vehicle window blind of claim 1 including pull cords operatively connected between said housing means first portion and said spring plate for retracting said second end of said blind toward said housing means first portion.

5. The vehicle window blind of claim 4 wherein said housing means includes a support hook for engagement over and support from the upper edge of a downwardly retractable vehicle window.

6. The vehicle window blind of claim 5 wherein said first and two opposing guide portions include in-turned flanges for confining said blade against lateral movement when in both the extended and retracted positions thereof.

* * * * *